(12) United States Patent
Kalnes et al.

(10) Patent No.: US 7,982,077 B2
(45) Date of Patent: *Jul. 19, 2011

(54) PRODUCTION OF DIESEL FUEL FROM BIORENEWABLE FEEDSTOCKS WITH SELECTIVE SEPARATION OF CONVERTED OXYGEN

(75) Inventors: Tom N. Kalnes, LaGrange, IL (US); Terry L. Marker, Palos Heights, IL (US); John P. Brady, Algonquin, IL (US)

(73) Assignee: UOP LLC, Des Plaines, IL (US)

( * ) Notice: Subject to any disclaimer, the term of this patent is extended or adjusted under 35 U.S.C. 154(b) by 417 days.

This patent is subject to a terminal disclaimer.

(21) Appl. No.: 12/193,176

(22) Filed: Aug. 18, 2008

(65) Prior Publication Data

US 2009/0082603 A1    Mar. 26, 2009

Related U.S. Application Data

(60) Provisional application No. 60/973,792, filed on Sep. 20, 2007.

(51) Int. Cl.
*C07C 1/00* (2006.01)
*C07C 4/00* (2006.01)

(52) U.S. Cl. ........................ 585/240; 585/242

(58) Field of Classification Search .................. 585/240, 585/241, 242
See application file for complete search history.

(56) References Cited

U.S. PATENT DOCUMENTS

| | | | |
|---|---|---|---|
| 5,186,722 A | | 2/1993 | Cantrell et al. |
| 5,705,722 A * | | 1/1998 | Monnier et al. ............ 585/240 |
| 6,787,026 B2 * | | 9/2004 | Farshid ..................... 208/89 |
| 7,232,935 B2 | | 6/2007 | Jakkula et al. |
| 7,279,018 B2 | | 10/2007 | Jakkula et al. |
| 7,425,657 B1 | | 9/2008 | Elliott et al. |
| 7,459,597 B2 | | 12/2008 | Koivusalmi et al. |
| 7,491,858 B2 | | 2/2009 | Murzin et al. |
| 7,501,546 B2 | | 3/2009 | Koivusalmi et al. |
| 7,511,181 B2 * | | 3/2009 | Petri et al. ................ 585/240 |
| 7,540,952 B2 | | 6/2009 | Pinho et al. |
| 7,550,634 B2 * | | 6/2009 | Yao et al. ................. 585/240 |
| 2006/0186020 A1 | | 8/2006 | Gomes |
| 2006/0207166 A1 | | 9/2006 | Herskowitz et al. |
| 2007/0006523 A1 | | 1/2007 | Myllyoja et al. |
| 2007/0010682 A1 | | 1/2007 | Myllyoja et al. |
| 2007/0068848 A1 | | 3/2007 | Monnier et al. |

(Continued)

FOREIGN PATENT DOCUMENTS

CN    11270300 A    9/2008

(Continued)

*Primary Examiner* — N. Bhat (74) *Attorney, Agent, or Firm* — Maryann Maas (57) ABSTRACT

A process has been developed for producing diesel boiling range fuel from renewable feedstocks such as fats and oils from plants and animals where the process provides for sulfur-component management. The process involves catalytically treating a renewable feedstock by hydrogenating and deoxygenating to provide a hydrocarbon fraction useful as a diesel boiling range fuel. A selective separation such as a hot high pressure hydrogen stripper may be used to remove at least the carbon oxides from the first zone effluent and provide a liquid recycle stream at pressure and temperature. A vapor stream is separated from the net process effluent and at least carbon dioxide is removed using at least one selective or flexible amine absorber. The resulting hydrogen-rich stream is recycled to the reaction zone.

14 Claims, 4 Drawing Sheets

U.S. PATENT DOCUMENTS

| | | |
|---|---|---|
| 2007/0131579 A1 | 6/2007 | Koivusalmi et al. |
| 2007/0135316 A1 | 6/2007 | Koivusalmi et al. |
| 2007/0135663 A1 | 6/2007 | Aalto et al. |
| 2007/0161832 A1 | 7/2007 | Myllyoja et al. |
| 2007/0170091 A1 | 7/2007 | Monnier et al. |
| 2007/0175795 A1 | 8/2007 | Yao et al. |
| 2007/0260102 A1* | 11/2007 | Duarte Santiago et al. .. 585/733 |
| 2007/0281875 A1 | 12/2007 | Scheibel et al. |
| 2007/0287873 A1 | 12/2007 | Coupard et al. |
| 2007/0299291 A1 | 12/2007 | Koivusalmi |
| 2008/0025903 A1 | 1/2008 | Cortright |
| 2008/0033188 A1 | 2/2008 | Dumesic et al. |
| 2008/0045731 A1 | 2/2008 | Zhang |
| 2008/0050792 A1 | 2/2008 | Zmierczak et al. |
| 2008/0052983 A1 | 3/2008 | Aulich et al. |
| 2008/0066374 A1 | 3/2008 | Herskowitz |
| 2008/0092436 A1 | 4/2008 | Seames et al. |
| 2008/0132435 A1 | 6/2008 | Ferreira Fontes et al. |
| 2008/0156694 A1 | 7/2008 | Chapus et al. |
| 2008/0161614 A1 | 7/2008 | Bertoncini et al. |
| 2008/0161615 A1 | 7/2008 | Chapus et al. |
| 2008/0163543 A1 | 7/2008 | Abhari et al. |
| 2008/0173570 A1 | 7/2008 | Marchand et al. |
| 2008/0216391 A1 | 9/2008 | Cortright et al. |
| 2008/0229654 A1 | 9/2008 | Bradin |
| 2008/0244962 A1 | 10/2008 | Abhari et al. |
| 2008/0281134 A1 | 11/2008 | Ghonasgi et al. |
| 2008/0300434 A1 | 12/2008 | Cortright et al. |
| 2008/0300435 A1 | 12/2008 | Cortright et al. |
| 2008/0302001 A1 | 12/2008 | Koivusalmi et al. |
| 2008/0308457 A1 | 12/2008 | Dindi et al. |
| 2008/0308458 A1 | 12/2008 | Dindi et al. |
| 2008/0312480 A1 | 12/2008 | Dindi et al. |
| 2008/0313955 A1 | 12/2008 | Silva et al. |
| 2009/0014354 A1 | 1/2009 | Knuuttila et al. |
| 2009/0019763 A1 | 1/2009 | Ghonasgi et al. |
| 2009/0029427 A1 | 1/2009 | Miller |
| 2009/0031617 A1 | 2/2009 | O'Rear |
| 2009/0062578 A1 | 3/2009 | Koivusalmi et al. |
| 2009/0069610 A1 | 3/2009 | Roberts, IV et al. |
| 2009/0071872 A1 | 3/2009 | Ginosar et al. |
| 2009/0077864 A1 | 3/2009 | Marker et al. |
| 2009/0077865 A1 | 3/2009 | Kalnes et al. |
| 2009/0077866 A1 | 3/2009 | Kalnes et al. |
| 2009/0077867 A1 | 3/2009 | Marker et al. |
| 2009/0077868 A1 | 3/2009 | Brady et al. |
| 2009/0078611 A1 | 3/2009 | Marker et al. |
| 2009/0082606 A1 | 3/2009 | Marker et al. |
| 2009/0084026 A1 | 4/2009 | Miller |
| 2009/0088351 A1 | 4/2009 | Miller |
| 2009/0107033 A1 | 4/2009 | Gudde et al. |
| 2009/0124839 A1 | 5/2009 | Dumesic et al. |
| 2009/0126260 A1 | 5/2009 | Aravanis et al. |
| 2009/0193709 A1 | 8/2009 | Marker et al. |

FOREIGN PATENT DOCUMENTS

| | | |
|---|---|---|
| CN | 11343552 A | 1/2009 |
| EP | 1719811 A1 | 8/2006 |
| EP | 2046917 A0 | 1/2008 |
| WO | 2007063874 A1 | 6/2007 |
| WO | 2007064015 A1 | 6/2007 |
| WO | 2007064019 A1 | 6/2007 |
| WO | WO 2007/064019 A1 | 6/2007 |
| WO | WO 07063874 A1 | 6/2007 |
| WO | WO 2007/064015 A1 | 6/2007 |
| WO | 2007125332 A1 | 11/2007 |
| WO | WO 2007/125332 A1 | 11/2007 |
| WO | 2007141293 A1 | 12/2007 |
| WO | WO 2007/141293 A1 | 12/2007 |
| WO | 2008012415 A2 | 1/2008 |
| WO | WO 2008/012415 A2 | 1/2008 |
| WO | 2008020048 A2 | 2/2008 |
| WO | WO 2008/020048 A2 | 2/2008 |
| WO | 2008053284 A1 | 5/2008 |
| WO | WO 2008/053284 A1 | 5/2008 |
| WO | 2008101945 A1 | 8/2008 |
| WO | WO 2008/101945 A1 | 8/2008 |
| WO | 2008105518 A1 | 9/2008 |
| WO | 2008119895 A2 | 9/2008 |
| WO | WO 2008/105518 A1 | 9/2008 |
| WO | WO 2008/119895 A2 | 9/2008 |
| WO | 2008141830 A1 | 11/2008 |
| WO | 2008141831 A1 | 11/2008 |
| WO | WO 2008/141830 A1 | 11/2008 |
| WO | WO 2008/141831 A1 | 11/2008 |
| WO | 2008151792 A1 | 12/2008 |
| WO | 2008152199 A1 | 12/2008 |
| WO | WO 2008/151792 A1 | 12/2008 |
| WO | WO 2008/152199 A1 | 12/2008 |
| WO | 2009004181 A2 | 1/2009 |
| WO | 2009011639 A2 | 1/2009 |
| WO | 2009013233 A2 | 1/2009 |
| WO | WO 2009/004181 A2 | 1/2009 |
| WO | WO 2009/011639 A2 | 1/2009 |
| WO | WO 2009/013233 A2 | 1/2009 |
| WO | 2009025542 A1 | 2/2009 |
| WO | WO 2009/020055 A1 | 2/2009 |
| WO | WO 2009/025542 A1 | 2/2009 |
| WO | 2009059819 A1 | 5/2009 |
| WO | 2009059920 A2 | 5/2009 |
| WO | WO 2009/059819 A1 | 5/2009 |
| WO | WO 2009/059920 A2 | 5/2009 |

* cited by examiner

PRODUCTION OF DIESEL FUEL FROM BIORENEWABLE FEEDSTOCKS WITH SELECTIVE SEPARATION OF CONVERTED OXYGEN

CROSS-REFERENCE TO RELATED APPLICATION

This application claims priority from Provisional Application Ser. No. 60/973,792 filed Sep. 20, 2007, the contents of which are hereby incorporated by reference in its entirety.

FIELD OF THE INVENTION

This invention relates to a process for producing diesel boiling range fuel and fuel blending component from renewable feedstocks such as the triglycerides and free fatty acids found in materials such as plant oils, fish oils, animal fats, and greases. Hydrogenation and deoxygenation are performed in one or more reactors. One or more sulfur compounds are present in the reaction mixture. A vapor stream is separated from the reaction zone effluent, and carbon dioxide is separated from the vapor stream. Optionally, a sulfur-containing stream may also be separated.

BACKGROUND OF THE INVENTION

As the demand for diesel boiling range fuel increases worldwide there is increasing interest in sources other than crude oil for producing diesel boiling range fuel and diesel boiling range fuel blending components. One such renewable source is what has been termed biorenewable sources. These renewable sources include, but are not limited to, plant oils such as corn, rapeseed, canola, soybean and algal oils, animal fats such as inedible tallow, fish oils and various waste streams such as yellow and brown greases and sewage sludge. The common feature of these sources is that they are composed of glycerides and Free Fatty Acids (FFA). Both of these classes of compounds contain aliphatic carbon chains having from about 8 to about 24 carbon atoms. The aliphatic carbon chains in the glycerides or FFAs can be fully saturated, or mono, di or poly-unsaturated.

There are reports in the art disclosing the production of hydrocarbons from oils. For example, U.S. Pat. No. 4,300,009 discloses the use of crystalline aluminosilicate zeolites to convert plant oils such as corn oil to hydrocarbons such as gasoline and chemicals such as para-xylene. U.S. Pat. No. 4,992,605 discloses the production of hydrocarbon products in the diesel boiling range by hydroprocessing vegetable oils such as canola or sunflower oil. Finally, US 2004/0230085 A1 discloses a process for treating a hydrocarbon component of biological origin by hydrodeoxygenation followed by isomerization.

Applicants have developed a process which comprises one or more steps to hydrogenate and deoxygenate (via catalytic decarboxylation, decarbonylation and/or hydrodeoxygenation) the feedstock. Sulfur containing components may be naturally present in the feedstock or may be added to the feedstock or the reaction mixture for various different purposes. Carbon dioxide and water are generated in the reaction zone and need to be at least partially removed from the reactor effluent prior to recycling any excess hydrogen back to the reaction zone. The effluent from the reaction zone is separated into at least a vapor portion and a liquid portion through, for example, cooling and separating. At least some of the liquid portion may be recycled to the reaction zone. The vapor portion is treated using an amine absorber solution to remove at least the carbon dioxide and optionally the sulfur component such as hydrogen sulfide so that the remaining hydrogen can be recycled back to the first reaction zone. The separated carbon dioxide and the separated hydrogen sulfide may be used for other purposes. Optionally, a selective separation unit such as a hot high pressure hydrogen stripper may be employed to selectively separate the majority of the hydrocarbon liquid portion from the vapor portion of the effluent and some of this hot, high pressure hydrocarbon liquid portion may be recycled to the reactor. The vapor portion is then cooled to separate any water.

SUMMARY OF THE INVENTION

A hydroconversion process for producing a diesel product from a renewable feedstock wherein the process comprises treating the feedstock in a catalytic reaction zone by hydrogenating and deoxygenating the feedstock at reaction conditions to provide a reaction product comprising a hydrocarbon fraction comprising paraffins and a gaseous fraction comprising at least carbon dioxide and hydrogen. At least one sulfur containing component is present in the reaction mixture. The sulfur containing component may be present as a naturally occurring contaminant or may be intentionally added to the feedstock or reaction mixture. Many sulfur containing components will form hydrogen sulfide in the reactor.

The carbon dioxide generated in the catalytic reaction zone and any excess hydrogen are selectively removed from the desired reaction product as a vapor stream using, for example, (1) a cooling and separating process or (2) an integrated hot high pressure hydrogen stripper using a high purity hydrogen stream as the stripping gas followed by the cooling and separating process. The carbon dioxide is then separated from the hydrogen using at least one selective amine absorber solution. The hydrogen sulfide may be removed from the vapor stream using the amine absorber solution, or the amine absorber solution may be specially chosen to allow the hydrogen sulfide to recycle with the hydrogen to the reactor. In one embodiment, more than one amine absorber solution may be used in a flexible absorber.

DETAILED DESCRIPTION OF THE INVENTION

As stated, the present invention relates to a process for producing a hydrocarbon stream useful as diesel boiling range fuel or fuel blending component from renewable feedstocks such as renewable feedstocks originating from plants or animals. Some of these feedstocks are known as biorenewable fats and oils. The term renewable feedstock is meant to include feedstocks other than those obtained from crude oil. The renewable feedstocks that can be used in the present invention include any of those which comprise glycerides and free fatty acids (FFA). Most of the glycerides will be triglycerides, but monoglycerides and diglycerides may be present and processed as well. Examples of these renewable feedstocks include, but are not limited to, canola oil, corn oil, soy oils, rapeseed oil, soybean oil, colza oil, tall oil, sunflower oil, hempseed oil, olive oil, linseed oil, coconut oil, castor oil, peanut oil, palm oil, mustard oil, *jatropha* oil, tallow, yellow and brown greases, lard, train oil, fats in milk, fish oil, algal oil, sewage sludge, and the like. Additional examples of renewable feedstocks include non-edible vegetable oils from the group comprising *Jatropha curcas* (Ratanjoy, Wild Castor, Jangli Erandi), *Madhuca indica* (Mohuwa), *Pongamia pinnata* (Karanji Honge), and *Azadiracta indicia* (Neem). The glycerides and FFAs of the typical vegetable or animal fat contain aliphatic hydrocarbon chains in their structure which have about 8 to about 24 carbon atoms with a majority of the fats and oils containing high concentrations of fatty acids with 16 and 18 carbon atoms. Mixtures or co-feeds of renewable feedstocks and hydrocarbons from petroleum crude oil may also be used as the feedstock. Other feedstock components which may be used, especially as a co-feed component in combination with the above listed feedstocks, include spent motor oils and industrial lubricants, used paraffin waxes, liquids derived from the gasification of coal, biomass, or natural gas followed by a downstream liquefaction step such as Fischer-Tropsch technology, liquids derived from depolymerization, thermal or chemical, of waste plastics such as polypropylene, high density polyethylene, and low density polyethylene; and other synthetic oils generated as byproducts from petrochemical and chemical processes. Mixtures of the above feedstocks may also be used as co-feed components. In some applications, an advantage of using a co-feed component is the transformation of what may have been considered to be a waste product from a petroleum based or other process into a valuable co-feed component to the current process.

Renewable feedstocks that can be used in the present invention may contain a variety of impurities. For example, tall oil is a byproduct of the wood processing industry and tall oil contains esters and rosin acids in addition to FFAs. Rosin acids are cyclic carboxylic acids. The renewable feedstocks may also contain contaminants such as alkali metals, e.g. sodium and potassium, phosphorous as well as solids, water and detergents. An optional first step is to remove some or all of these contaminants. One possible pretreatment step involves contacting the renewable feedstock with an ion-exchange resin in a pretreatment zone at pretreatment conditions. The ion-exchange resin is an acidic ion exchange resin such as Amberlyst™-15 and can be used as a bed in a reactor through which the feedstock is flowed through, either upflow or downflow. The conditions at which the reactor is operated are well known in the art.

Another possible means for removing contaminants is a mild acid wash. This is carried out by contacting the feedstock with an acid such as sulfuric, nitric or hydrochloric acid in a reactor. The acid and feedstock can be contacted either in a batch or continuous process. Contacting is done with a dilute acid solution usually at ambient temperature and atmospheric pressure. If the contacting is done in a continuous manner, it is usually done in a counter current manner. Yet another possible means of removing metal contaminants from the feedstock is through the use of guard beds some of which are well known in the art. These can include alumina guard beds either with or without demetallation catalysts such as nickel or cobalt. Filtration and solvent extraction techniques are other choices which may be employed. Hydroprocessing such as that described in U.S. application Ser. No. 11/770, 826, incorporated by reference, is another pretreatment technique which may be employed.

The renewable feedstock is flowed to a first reaction zone comprising one or more catalyst beds in one or more reactors. The term "feedstock" is meant to include feedstocks that have not been treated to remove contaminants as well as those feedstocks purified in a pretreatment zone. In the reaction first zone, the feedstock is contacted with a hydrogenation or hydrotreating catalyst in the presence of hydrogen at hydrogenation conditions to hydrogenate reactive component such as the olefinic or unsaturated portions of the aliphatic side chains of a triglyceride molecule. Hydrogenation and hydrotreating catalysts are any of those well known in the art such as nickel or nickel/molybdenum dispersed on a high surface area support. Other hydrogenation catalysts include one or more noble metal catalytic elements dispersed on a high surface area support. Non-limiting examples of noble metals include Pt and/or Pd dispersed on gamma-alumina. Hydrogenation conditions include a temperature of about 40° C. to about 400° C. and a pressure of about 689 kPa absolute (100 psia) to about 13,790 kPa absolute (2000 psia). In another embodiment the hydrogenation conditions include a temperature of about 200° C. to about 300° C. and a pressure of about 1379 kPa absolute (200 psia) to about 4826 kPa absolute (700 psia). Other operating conditions for the hydrogenation zone are well known in the art.

The hydrogenation and hydrotreating catalysts enumerated above are also capable of catalyzing decarbonylation, decarboxylation and/or hydrodeoxygenation of the feedstock to remove oxygen. Decarbonylation, decarboxylation, hydrodeoxygenation and hydrogenation are herein collectively referred to as deoxygenation reactions. Decarbonylation, decarboxylation, and hydrodeoxygenation conditions include a relatively low pressure of about 3447 kPa (500 psia) to about 6895 kPa (1000 psia), a temperature of about 200° C. to about 400° C. and a liquid hourly space velocity of about 0.5 to about 10 $hr^{-1}$. In another embodiment the decarbonylation, decarboxylation, and hydrodeoxygenation conditions include the same relatively low pressure of about 3447 kPa (500 psia) to about 6895 kPa (1000 psia), a temperature of about 288° C. to about 345° C. and a liquid hourly space velocity of about 1 to about 4 $hr^{-1}$. Since hydrogenation is an exothermic reaction, as the feedstock flows through the catalyst bed the temperature increases and decarboxylation, decarbonylation and hydrodeoxygenation will begin to occur. Thus, it is envisioned and is within the scope of this invention that all the reactions may occur simultaneously in one reactor or in one bed. Alternatively, the conditions can be controlled such that hydrogenation primarily occurs in one bed and decarboxylation, decarbonylation and/or hydrodeoxygenation occurs in a second bed. Of course if only one bed is used, then hydrogenation occurs primarily at the front of the bed, while decarboxylation, decarbonylation and hydrodeoxygenation occur mainly in the middle and bottom of the bed. Finally, desired hydrogenation can be carried out in one reactor, while decarboxylation and/or hydrodeoxygenation can be carried out in a separate reactor.

Sulfur containing components are often present in the reaction mixture. Such components may be present in the feedstock naturally, or may be added to the feedstock or the reaction zone. Sulfur-containing components may be organic, inorganic, natural, or synthetic. A single sulfur-containing component may be present or more than one may be present. The sulfur containing component may be present in an amount ranging from about 1 ppm to about 5 mass %. Many sulfur containing components are converted to hydrogen sulfide in the reaction zone. For ease of understanding, the description below will use the term hydrogen sulfide as the primary example of a sulfur containing component, but that is not meant to limit the scope of the claims in any way.

The reaction product from the deoxygenation reactions comprises both a liquid portion and a gaseous portion. The liquid portion comprises a hydrocarbon fraction which is primarily paraffins and having a large concentration of paraffins in the range of about 9 to about 18 carbon atoms. Different feedstocks will result in different distributions of paraffins. The gaseous portion comprises hydrogen, carbon dioxide, carbon monoxide, water vapor, propane and perhaps sulfur components such as hydrogen sulfide or phosphorous component such as phosphine. For the case where there is no isomerization catalyst in the reaction zone, most of the hydrocarbons will be normal paraffins. In this case, the hydrogenation or hydrotreating/deoxygenation catalyst may catalyze a slight amount of isomerization but it is expected that no more than about 5 or about 10 mass % of the normal paraffins would be isomerized to branched paraffins. The diesel boiling range fuel cold flow properties depend on the relative amounts of normal and branched paraffin in the product. In warmer climate regions, poor cold flow properties are not a great concern. In colder climate regions, improvements to cold flow properties are needed and at least some of the normal paraffins are isomerized to branched paraffins. By optimizing the isomerization requirement where appropriate due to the climate, a substantial cost savings in both capital costs and operating costs can be achieved.

The effluent from the reaction zone is conducted to a selective separation zone comprising, for example, a heat exchanger and a product separator and optionally an air or water cooler. After cooling, a vapor stream containing the hydrogen, hydrogen sulfide, carbon monoxide, and carbon dioxide is readily separated from the liquid phase containing the normal paraffins having from about 8 to about 24 carbon atoms in the product separator. Suitable operating conditions of the separator include, for example, a temperature of about 20 to 80° C. or 40 to 50° C. and a pressure of about 2758 kPa absolute (400 psia) to about 68985 kPa absolute (1000 psia) with a specific embodiment at 3850 kpa absolute (560 psia). This selective separation zone is operated at essentially the same pressure as the reaction zone. By "essentially" it is meant that the operating pressure of the selective separation zone is within about 1034 kPa absolute (150 psia) of the operating pressure of the reaction zone. For example, the selective separation zone is no more than 1034 kPa absolute (150 psia) less than that of the reaction zone. The vapor stream and the liquid stream are both removed from the product separator. A portion of the liquid stream may be recycled to the reaction zone, at the feed location or at one or more intermediate locations. A water byproduct stream is also removed. The liquid stream may be recovered or may be routed to a product recovery column to separate the light ends from the diesel and naphtha products.

Optionally, the effluent from the deoxygenation reaction zone is conducted to a hot high pressure hydrogen stripper before at least a portion of the effluent is cooled and conducted to the cold product separator. One benefit of this embodiment is that a liquid stream of paraffins is generated at or near to the temperature and pressure of the reaction zone, and a portion of that stream may be recycled to the reaction zone with minimal pumping energy and minimal additional heating. Saving the utilities of pumping and reheating can significantly reduce the cost of the overall process and if the recycle stream is large enough would more than offset the additional capital cost of the hot high pressure hydrogen stripper. Likewise the net liquid going to the product recovery column needs less heating to separate light byproducts. Another benefit is the liquid stream is essentially dry and therefore does not carry water back to the reactor. In addition, the separation in the cold product separator becomes more efficient since the phase separation does not include the densest hydrocarbons having from about 8 to about 24 or more carbon atoms. Furthermore, any unreacted glycerides or free fatty acids present in the reactor effluent during a unit start-up or unit upset are selectively removed in the hot separator liquid and do not come into contact with a condensed water phase where they could contaminate the byproduct water.

The reaction zone effluent enters the hot high pressure hydrogen stripper and the water and normally gaseous components, are carried with the hydrogen stripping gas and separated into an overhead stream. By using a dry hydrogen stream as the stripping gas, water, carbon monoxide, carbon dioxide, and any ammonia or hydrogen sulfide are selectively separated from the hydrocarbon liquid product in the hot high pressure hydrogen stripper. The hydrogen stripping gas can be hydrogen make-up gas that is effectively free of carbon oxides and water. By effectively free, it is meant that the hydrogen make-up gas is free of carbon oxides and water, or if carbon oxides or water are present they are in such a small amount so as not to effect the stripping. The remainder of the deoxygenation effluent stream is removed as hot high pressure hydrogen stripper bottoms and contains the liquid hydrocarbon fraction having components such as normal hydrocarbons having from about 8 to about 24 carbon atoms. A portion of this liquid hydrocarbon fraction in hot high pressure hydrogen stripper bottoms may be used as the hydrocarbon recycle described below, and the stripper bottoms are already at or near the operating conditions of the reaction zone thereby saving the costs involved with pumping or heating of the recycle portion. The stripper bottoms are conducted to a product recovery column.

The temperature of the hot high pressure hydrogen stripper may be controlled in a limited range to achieve the desired separation and the pressure may be maintained at approximately the same pressure as the reaction zone to minimize both investment and operating costs. The hot high pressure hydrogen stripper may be operated at conditions ranging from a pressure of about 689 kPa absolute (100 psia) to about 13,790 kPa absolute (2000 psia), and a temperature of about 40° C. to about 350° C. In another embodiment the hot high pressure hydrogen stripper may be operated at conditions ranging from a pressure of about 1379 kPa absolute (200 psia) to about 4826 kPa absolute (700 psia), or about 2413 kPa absolute (350 psia) to about 4882 kPa absolute (650 psia), and a temperature of about 50° C. to about 350° C. The hot high pressure hydrogen stripper may be operated at essentially the same pressure as the reaction zone. By "essentially" it is meant that the operating pressure of the high pressure hydrogen stripper is within about 1034 kPa absolute (150 psia) of the operating pressure of the reaction zone. For example, the pressure of the hot high pressure hydrogen stripper separation zone is no more than 1034 kPa absolute (150 psia) less than that of the reaction zone. Also, the stream entering the hot high pressure hydrogen stripper may be heat exchanged to reduce the temperature before entering the hot high pressure hydrogen stripper. In this way the optimum temperature value needed to achieve the selective separation is obtained prior to entering the hot high pressure hydrogen stripper.

One purpose of the hot high pressure hydrogen stripper is to separate the gaseous portion of the effluent from the liquid portion of the effluent. As hydrogen is an expensive resource, to conserve costs, the separated hydrogen is ultimately recycled to the deoxygenation reactor. Hydrogen is a reactant in at least one of the deoxygenation reactions, and to be effective, a sufficient quantity of hydrogen must be in solution to most effectively take part in the catalytic reaction. Past processes have operated at high pressures in order to achieve a desired amount of hydrogen in solution that is readily available for reaction. However, higher pressure operations are more costly to build and to operate as compared to their lower pressure counterparts. One advantage of the present invention is the ability to operate in a pressure range of about 1379 kPa absolute (200 psia) to about 4826 kPa absolute (700 psia) which is lower than that found in other previous operations. In another embodiment the operating pressure is in the range of about 2413 kPa absolute (350 psia) to about 4481 kPa absolute (650 psia), and in yet another embodiment operating pressure is in the range of about 2758 kPa absolute (400 psia) to about 4137 kPa absolute (600 psia). Furthermore, the rate of reaction is increased resulting in a greater amount of throughput of material through the reactor in a given period of time.

In one embodiment, the desired amount of hydrogen is kept in solution at lower pressures by employing a large recycle of hydrocarbon. Other processes have employed hydrocarbon recycle in order to control the temperature in the reaction zones since the reactions are exothermic reactions. However, the range of recycle to feedstock ratios used herein is determined not on temperature control requirements, but instead, based upon feedstock composition and hydrogen solubility requirements. Hydrogen has a greater solubility in the hydrocarbon product than it does in the feedstock. By utilizing a large hydrocarbon recycle the solubility of hydrogen in the liquid phase in the reaction zone is greatly increased and higher pressures are not needed to increase the amount of hydrogen in solution. In one embodiment of the invention, the volume ratio of hydrocarbon recycle to feedstock is from about 2:1 to about 8:1. In another embodiment the ratio is in the range of about 3:1 to about 6:1 in yet another embodiment the ratio is in the range of about 4:1 to about 5:1, and in still another embodiment the ratio is in the range of about 2:1 to about 6:1.

The gaseous portion of the reaction zone effluent in the overhead from the hot high pressure hydrogen stripper is cooled, by techniques such as heat exchange, air cooling, or water cooling and passed to a cold separator where liquid components are separated from the gaseous components by phase separation. Suitable operating conditions of the cold separator include, for example, a temperature of about 20 to 80° C. or 40 to 50° C. and a relatively low pressure of about 3447 kPa (500 psia) to about 6895 kPa (1000 psia), with one embodiment at 3850 kPa absolute (560 psia). A water byproduct stream is also separated. The gaseous component stream from the cold separator comprises hydrogen, carbon monoxide, carbon dioxide, and hydrogen sulfide while the liquid component stream from the cold separator comprises naphtha and LPG. Again, this separation may be operated at essentially the same pressure as the reaction zone. By "essentially" it is meant that the operating pressure of the cold separator is within about 1034 kPa absolute (150 psia) of the operating pressure of the reaction zone. For example, the pressure of the separator is no more than 1034 kPa absolute (150 psia) less than that of the reaction zone Either the hot high pressure hydrogen stripper bottoms or the liquid component from the cold product separator in the embodiment with no hot high pressure hydrogen stripper may be recovered as diesel product. However, the liquid component from the product separator and the hot high pressure hydrogen stripper bottoms, if present, collectively contain the hydrocarbons useful as diesel boiling range fuel as well as smaller amounts of naphtha and LPG and may be further purified in a product recovery column. The product recovery column fractionates lower boiling components and dissolved gases from the diesel product containing $C_8$ to $C_{24}$ paraffins. Suitable operating conditions of the product recovery column include a temperature of from about 20 to about 200° C. at the overhead and a pressure from about 0 to about 1379 kPa absolute (0 to 200 psia).

The LPG and naphtha stream may be further separated in a debutanizer or depropanizer in order to separate the LPG into an overhead stream, leaving the naphtha in a bottoms stream. Suitable operating conditions of this unit include a temperature of from about 20 to about 200° C. at the overhead and a pressure from about 0 to about 2758 kPa absolute (0 to 400 psia). The LPG may be sold as valuable product or may be used as feed to a hydrogen production facility. Similarly, the naphtha may be used as feed to a hydrogen production facility.

The gaseous component separated in the product separator of either embodiment above comprises mostly hydrogen and the carbon dioxide from the decarboxylation reaction. Other components such as carbon monoxide, propane, and hydrogen sulfide or other sulfur containing component may be present as well. It is desirable to recycle the hydrogen to the reaction zone, but if the carbon dioxide was not removed, its concentration would quickly build up and effect the operation of the reaction zone. Usually, carbon dioxide would be removed from the hydrogen by means well known in the art such as absorption, along with hydrogen sulfide, using an amine, reaction with a hot carbonate solution, pressure swing adsorption, etc. and if desired, essentially pure carbon dioxide could be recovered by regenerating the spent absorption media. However, the separation of carbon dioxide from hydrogen is complicated by the sulfur containing component such as hydrogen sulfide which is present to maintain the sulfided state of the deoxygenation catalyst or to control the relative amounts of the decarboxylation reaction and the hydrogenation reaction that are both occurring in the deoxygenation zone. Because the hydrogen sulfide serves a useful purpose in the deoxygenation reaction zone, it is desirable to recycle the hydrogen sulfide to the reaction zone as opposed to purchasing additional hydrogen sulfide or sulfur components. In some applications, there may be a need to control the level of hydrogen sulfide being recycled which may require removing substantially all the hydrogen sulfide in order to control the amount of separated hydrogen sulfide that is recycled to the reaction zone. Therefore, the techniques for removing the carbon dioxide also need to provide the sulfur management in the process.

In one embodiment of the invention an amine absorber is used to selectively remove carbon dioxide while allowing hydrogen and hydrogen sulfide to pass to recycle. In this embodiment the gaseous stream from the cold product separator is routed through an amine absorber containing an aqueous solution of a polyoxypropylene triamine having the formula:

Where R' represents a methylene group and R" represents hydrogen or methyl or ethyl and wherein the sum of X+Y=Z is a positive integer having a value of from about 4 to about 6.

These amines are fully described in U.S. Pat. No. 4,710,362 which is hereby incorporated by reference in its entirety. The amine is in an aqueous solution containing about 35 to about 55 wt. % of the polyoxypropylene triamine, and the absorption in the absorber may be conducted at about 20° C. to about 50° C.

In another embodiment, two amine absorbers are employed. The first amine scrubber removes both carbon dioxide and hydrogen sulfide allowing hydrogen to pass to recycle. The amine chosen to be employed in first amine absorber is capable of removing at least both the components of interest, carbon dioxide and the sulfur components such as hydrogen sulfide. Suitable amines are available from DOW and from BASF, and in one embodiment the amines are a promoted or activated methyldiethanolamine (MDEA). The promoter may be piperazine, and the promoted amine may be used as an aqueous solution. See U.S. Pat. No. 6,337,059, hereby incorporated by reference in its entirety. Suitable amines for the first amine absorber from DOW include the UCARSOL™ AP series solvents such as AP802, AP804, AP806, AP810 and AP814. The carbon dioxide and hydrogen sulfide are absorbed by the amine while the hydrogen passes through first amine absorber to be recycled to the first reaction zone. The amine is regenerated and the carbon dioxide and hydrogen sulfide are released and removed. The regenerated amine may be recycled and reused. The released carbon dioxide and hydrogen sulfide are passed through a second amine absorber which contains an amine selective to hydrogen sulfide, but not selective to carbon dioxide. Again, suitable amines are available from DOW and from BASF, and in one embodiment the amines are a promoted or activated MDEA. Suitable amines for the second amine absorber zone from DOW include the UCARSOL™ HS series solvents such as HS101, HS 102, HS103, HS104, HS115. Therefore the carbon dioxide passes through second amine absorber and is available for use elsewhere. The amine may be regenerated which releases the hydrogen sulfide to be recycled. A portion of the hydrogen sulfide may be sent to a Claus plant. Regenerated amine is then recycled and reused. The hydrogen sulfide recycle to the reaction zone may be controlled so that the appropriate amount of sulfur is maintained in the reaction zone. Conditions for the first scrubber zone includes a temperature in the range of about 30 to about 60° C. At least the first absorber is operated at essentially the same pressure as the reaction zone. By "essentially" it is meant that the operating pressure of the absorber is within about 1034 kPa absolute (150 psia) of the operating pressure of the reaction zone. For example, the pressure of the absorber is no more than about 1034 kPa absolute (150 psia) less than that of the reaction zone. Also, at least the first absorber is operated at a temperature that is at least about 1° C. higher than that of the separator. Keeping at least the first absorber warmer than the separator operates to maintain any light hydrocarbons in the vapor phase and prevents the light hydrocarbons from condensing into the absorber solvent. Conditions for the second amine solution absorber zone may include from about 20 to about 60° C. and a pressure in the range of about 138 kPa (20 psia) to about 241 kPa (35 psia).

The gaseous component stream from the cold product separator has a total volume that is much greater than the combined volume of carbon dioxide and hydrogen sulfide. Typically, the amount of hydrogen sulfide in vapor stream 36 ranges from about 0.01 to about 2 volume-%. In the configurations shown in the figures, the first amine absorber zone is sized to accommodate the flow of the entire vapor stream from the cold product separator. However, the second amine absorber zone is greatly reduced in size as compared to the first since the flow of material to the second amine absorber zone is only a fraction of vapor stream from the cold product separator. The reduction in the size of the second amine absorber zone allows for reduced capital and operating costs.

In yet another embodiment, the process may be equipped with a flexible solvent absorber. Processes discussed herein require sulfur management steps to control the sulfur component used in the process. However, not all renewable feedstock diesel processes require sulfur management. Therefore, to provide the greatest degree of flexibility from the process units, a flexible absorber may be employed as the amine absorber. A flexible absorber allows for at least two different amine solvents to be alternately supplied to the flexible absorber. The flexible absorber contains a first amine solution for a first application, and then the flexible absorber contains a second amine solution for a second application. The flexible absorber may be used to supply the carbon dioxide selective amine in one application, and the carbon dioxide and hydrogen sulfide selective amine in another application. When sulfur management is required, amines as discussed above may be supplied to the flexible absorber. In applications where sulfur management is not required, other amines may be supplied to the flexible absorber. The flexible absorption system allows for (a) selective removal of carbon dioxide from the recycle gas when feed sulfur content is low (for example in refined soybean oil) and when it is advantageous to allow hydrogen sulfide to build up in the recycle gas to maintain the required hydrogen sulfide partial pressure in the hydrodeoxygenation reaction zone and the flexible absorption also allows for (b) removal of both carbon dioxide and hydrogen sulfide from the recycle gas when the sulfur content in the reaction zone of the feed is high (such as with brown grease) and when it is undesirable for hydrogen sulfide to build up in the recycle gas to the deoxygentation reaction zone. Polyoxypropylenetriamine-rich solvent may be used for case (a) and a formulated MDEA-based solvent such as UCARSOL®, may be used for case (b). The choice of solvent will be dictated by the sulfur content in the reaction zone, the hydrodeoxygenation catalyst active metals loading and the target hydrogen sulfide concentration in the reaction zone.

Two separate solvent make-up systems and recycle reservoirs are required. The gas is sent to the bottom of the absorber vessel. The gas flows upward through the acid gas absorption section and then passes through a demisting pad. The absorber is equipped with multiple trays, or packing where the feed gas counter-currently contacts either the carbon dioxide selective polyoxypropylenetriamine-type solvent or the MDEA-based non-selective solvent. In both cases, the cooled lean solvent enters near the tower top through a liquid distributor and flows down through the packing, absorbing either the carbon dioxide while letting the hydrogen sulfide pass through or absorbing both the carbon dioxide and the hydrogen sulfide to the required product specification. This lean solvent line is equipped with an antifoam injection point to allow for the injection of anti-foam when needed. A solvent reservoir is maintained in the bottom of the absorber via liquid level control. High and low level alarms are provided since loss of liquid level can cause high-pressure gas to exit the absorber bottom. The product gas passes through a demisting pad at the top of the absorber to minimize entrainment of liquid. The product gas exiting the absorber leaves the zone water saturated.

As the effluent gas stream from the flexible absorber is recycled to the reaction zone it is typically required that the gas be first cooled and any condensable liquids removed in an appropriate separator. If separated, the condensable aqueous phase liquid recovered could contain solvent and to reduce solvent make-up requirements for the flexible unit, the aqueous phase from this downstream separator should be routed back to the absorber zone. The rich solvent may be regenerated as is known in the art. Two separate regeneration systems may be required, one for each of the different amine solvents that may be used.

The flexible absorber is operated at essentially the same pressure as the reaction zone pressure and near ambient temperature. By "essentially" it is meant that the pressure of the flexible absorber is within about 1034 kPa absolute (150 psia) of the pressure of the product separator. The pressure of the flexible absorber is no more than about 1034 kPa absolute (150 psia) less than the pressure of the product separator. Lean solvent should enter the absorber slightly warmer than the acid gas stream so as to prevent condensation of any light product hydrocarbons in the amine solvent.

For the amine solvent which selectively removes only carbon dioxide, the absorber effluent gas will contain from about 100 to about 1000 ppm carbon dioxide and >50% of the hydrogen sulfide present in the gas entering the absorber. For the amine solvent which selectively removes both carbon dioxide and hydrogen sulfide, the absorber effluent gas will contain <1 ppm hydrogen sulfide and from about 100 to about 1000 ppm carbon dioxide.

Figure 4:
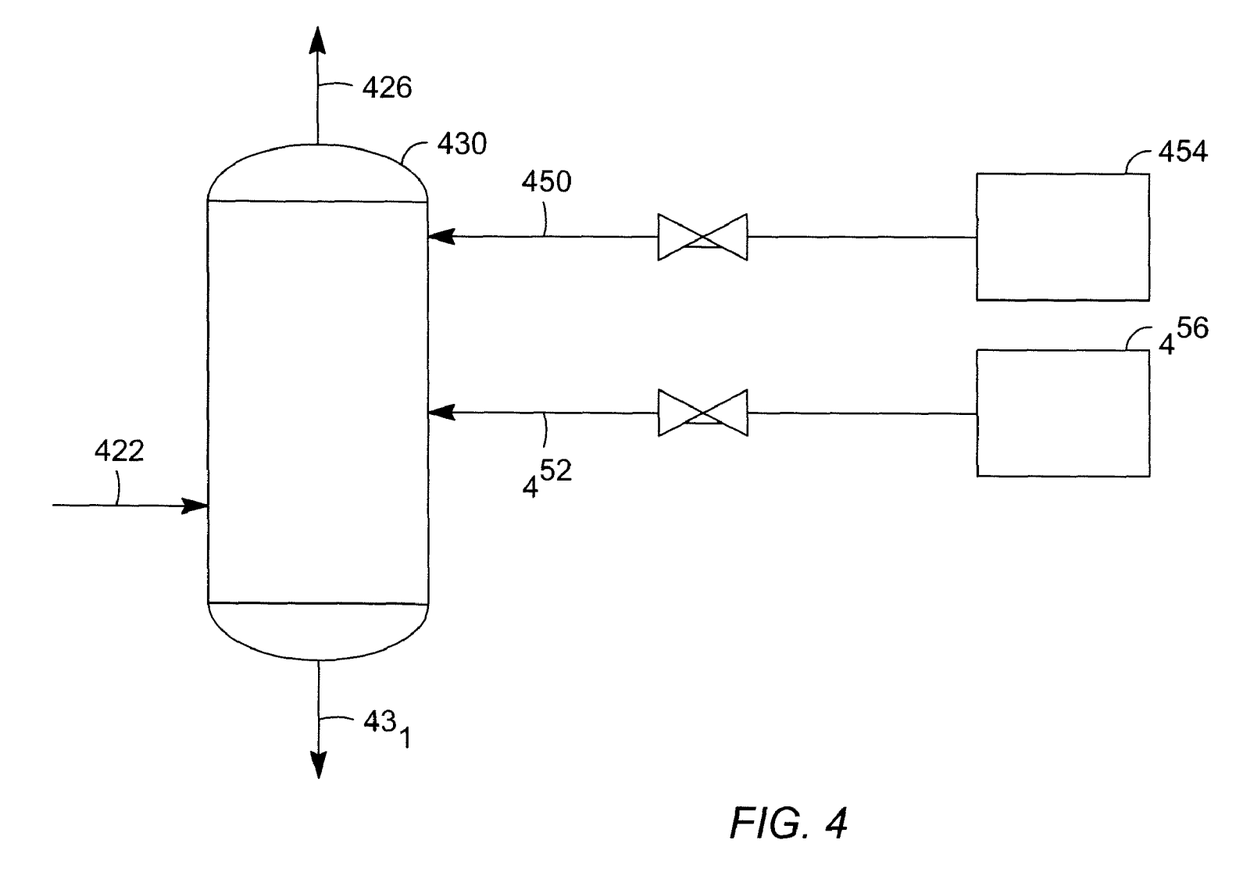
FIG. 4 is a portion of a flow scheme showing the operation of the flexible absorber embodiment.

At least one flexible absorber would be used in the place of a traditional absorber, but it is within the scope of the invention to replace all traditional absorbers with flexible absorbers. FIG. 4 shows a drawing of a sample flexible absorber. Vapor stream 422 from the cold product separator enters flexible absorber 430. Liquid amine absorber is introduced through either line 450 or 452. Line 450 is connected to first solvent source 454 and line 452 is connected to second solvent source 456. Each of the two solvent sources provide a solvent of differing selectivity. For example, first solvent source 454 may provide a solvent of the type disclosed in U.S. Pat. No. 4,710,362 and second solvent source 456 may provide a solvent such as the UCARSOL™ AP series solvents from DOW such as AP802, AP804, AP806, AP810 and AP814. As an example, when an application calls for only carbon dioxide to be removed from the stream 422, the solvent from the first solvent source 454 would be directed to flexible absorber 430. However, when an application requires both carbon dioxide and hydrogen sulfide to be removed from the stream 422, solvent from the second source would be directed to flexible absorber 430. In either case, solvent is removed from flexible absorber 430 via line 431 and conducted to a regeneration zone.

Other separation systems are possible, such as adsorbents and treating processes. However, the amine absorber systems of the present invention have several advantages with cost being a primary advantage. Amine absorber systems are less costly than molecular sieve adsorbents or treating processes, and the amine systems minimize the amount of hydrogen lost to the acid gas containing stream(s).

The hydrogen stream remaining after the removal of the carbon dioxide may be recycled to the reaction zone. The hydrogen stream may contain the hydrogen sulfide being recycled to the reaction zone, or the separated hydrogen sulfide may be recycled independently such as in controlled amounts. The hydrogen recycle stream may be introduced to the inlet of the reaction zone and/or to any subsequent beds/reactors.

The following embodiments are presented in illustration of this invention and are not intended as an undue limitation on the generally broad scope of the invention as set forth in the claims. First the process is described in general as with reference to FIG. 1. Then the process is described in more detail with reference to FIG. 2. Finally, the process is described in detail employing the optional hot high pressure hydrogen stripper with reference to FIG. 3.

Figure 1:
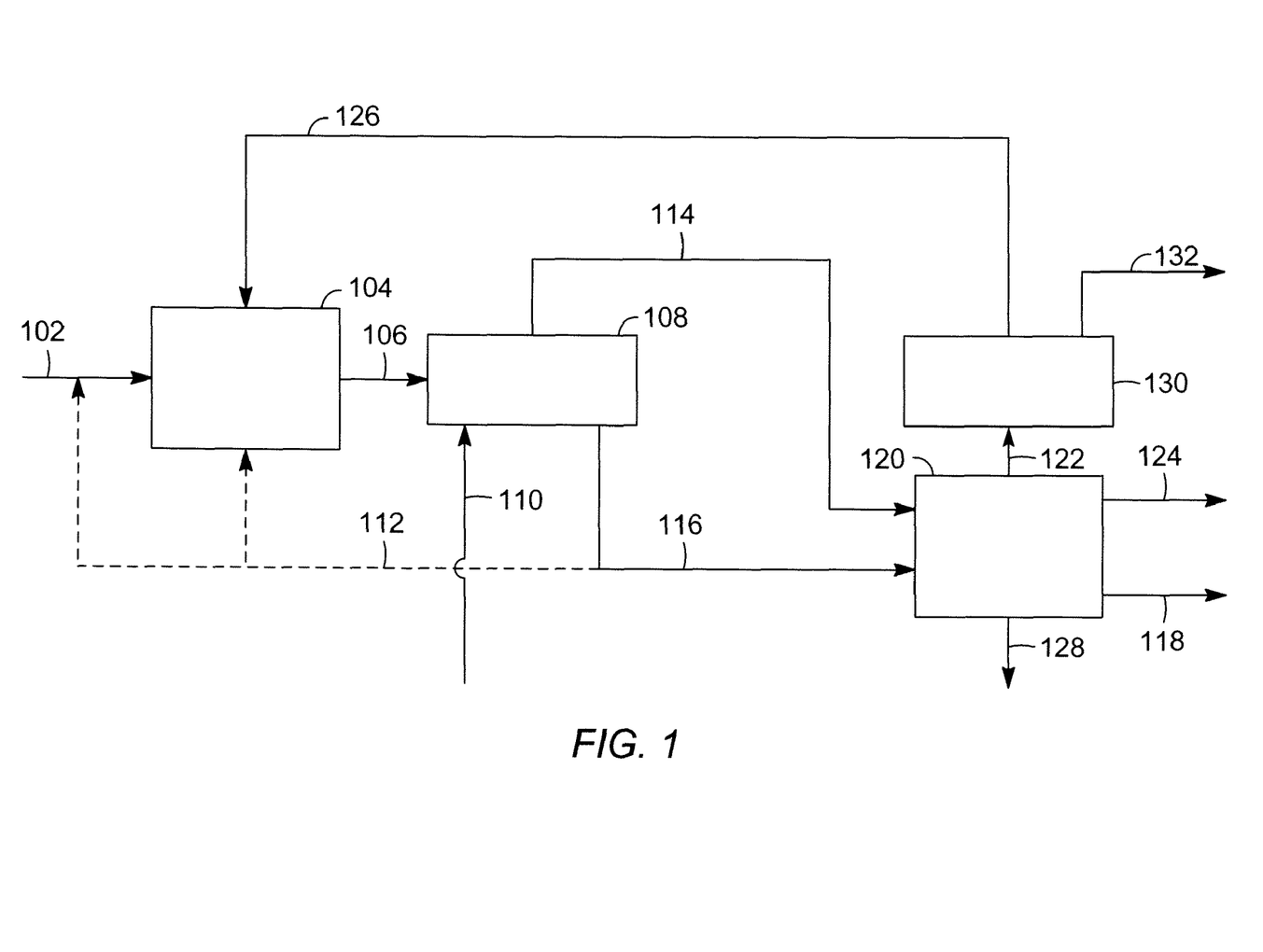
FIG. 1 is a general flow scheme diagram of the invention.

Turning to FIG. 1 renewable feedstock 102 enters deoxygenation reaction zone 104 along with recycle hydrogen and hydrogen sulfide stream 126 and optional product recycle 112. Hydrogen sulfide or another sulfur-containing component may be already present in or added to the renewable feedstock. In an alternate embodiment, hydrogen sulfide or another sulfur-containing component may be added to the reactor in reaction zone 104. Contacting the renewable feedstock with the deoxygenation catalyst generates deoxygenated product 106 which is directed to optional first selective separation zone 108 which comprises a hot high pressure hydrogen stripper. Hydrogen-rich make-up gas 110 and optionally recycle hydrogen is added to optional first selective separation zone.

Carbon oxides, hydrogen sulfide, and water vapor are removed with hydrogen in optional first selective separation zone overhead 114 and separated deoxygenated liquid product are removed in optional first selective separation zone bottoms 116. Both streams are passed to product recovery zone 120. Product recovery zone 120 comprises at least a cooler, a cold product separator, and a product recovery column. Carbon oxides, hydrogen sulfide, and hydrogen stream 122, light ends stream 124, water byproduct stream 128, and paraffin-rich product 118 are all removed from product recovery zone 120. Paraffin-rich product 118 may be collected for use as diesel boiling range fuel. Carbon oxides, hydrogen sulfide, and hydrogen stream 122 is directed to second selective separation zone 130 which contains one or more selective amine absorbers. At least carbon dioxide is removed from stream 122 via line 132. Optionally hydrogen sulfide may be removed as well. Hydrogen recycle stream 126 is removed from second selective separation zone and recycled to the deoxygenation reaction zone 104.

Figure 2:
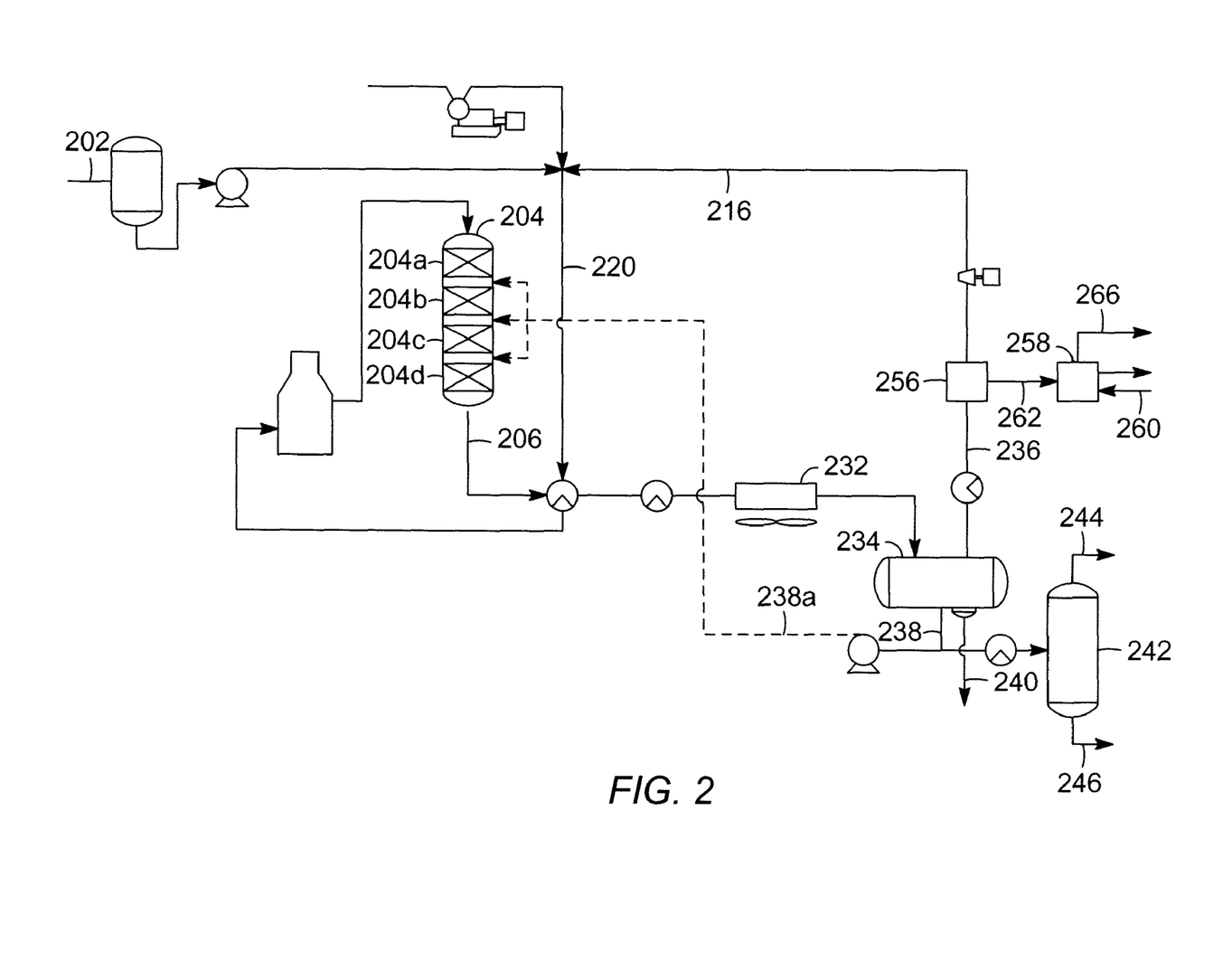
FIG. 2 is a more detailed flow scheme diagram of one embodiment of the invention.

Turning to FIG. 2, the process begins with a renewable feedstock stream 202 which may pass through an optional feed surge drum. The feedstock stream is combined with recycle stream 216 to form combined feed stream 220, which is heat exchanged with reactor effluent and then introduced into catalytic deoxygenation reactor 204. The heat exchange may occur before or after the recycle is combined with the feed. Deoxygenation reactor 204 may contain multiple beds shown in FIG. 2 as 204a, 204b, 204c and 204d. Deoxygenation reactor 204 contains at least one catalyst capable of catalyzing decarboxylation and/or hydrodeoxygenation of the feedstock to remove oxygen. Deoxygenation reactor effluent stream 206 containing the products of the decarboxylation and/or hydrodeoxygenation reactions is removed from deoxygenation reactor 204 and heat exchanged with stream 220 containing feed to the deoxygenation reactor. Stream 206 comprises a liquid component containing largely normal paraffin hydrocarbons in the diesel boiling range and a gaseous component containing largely hydrogen, vaporous water, carbon monoxide, carbon dioxide, hydrogen sulfide, and propane.

Deoxygenation reactor effluent stream 206, after one or more optional heat exchanges, is directed to air cooler 232 and then introduced into product separator 234. In product separator 234 the gaseous portion of the stream comprising hydrogen, carbon monoxide, hydrogen sulfide, carbon dioxide and propane are phase separated and removed in stream 236 while the liquid hydrocarbon portion of the stream is removed in stream 238. A portion of the liquid hydrocarbon stream 238a is recycled to the reaction zone 204. A water byproduct stream 240 may also be removed from product separator 234. Stream 238 is introduced to product recovery column 242 where components having higher relative volatilities are separated into stream 244 with the remainder, the diesel range components, being withdrawn from product recovery column 242 in line 246. Stream 244 is optionally introduced into a fractionator which operates to separate LPG into an overhead leaving a naphtha bottoms stream (not shown).

The vapor stream 235 from product separator 234 contains the gaseous portion of the reaction zone effluent which comprises at least hydrogen, carbon monoxide, hydrogen sulfide, carbon dioxide and propane and is directed to a system of at least one amine absorber and regenerator 256 to separate carbon dioxide and optionally hydrogen sulfide from the vapor stream. Because of the cost of hydrogen, it is desirable to recycle the hydrogen to deoxygenation reactor 204, but it is not desirable to circulate the carbon dioxide or an excess of sulfur containing components. In one embodiment, vapor stream 235 is passed through a system of one amine absorber 256, also called a scrubber. The amine chosen to be employed in the single amine absorber 256 is capable of selectively removing carbon dioxide while allowing hydrogen and hydrogen sulfide to pass through the absorber. Suitable amines for use in are described in U.S. Pat. No. 4,710,362. The amine absorber may be operated at from about 20 to about 60 C and a pressure in the range of about 3447 kPa (500 psia) to about 6895 kPa (1000 psia).

In another embodiment, to separate both the sulfur containing components and the carbon dioxide from the hydrogen, vapor stream 235 is passed through a system of at least two amine absorbers 256 and 258. The amine employed in amine absorber 256 is capable of selectively removing at least both the components of interest, carbon dioxide and the sulfur components such as hydrogen sulfide. Suitable amines are available from DOW and from BASF, and in one embodiment the amines are a promoted or activated methyldiethanolamine (MDEA). The promoter may be piperazine, and the promoted amine may be used as an aqueous solution. See U.S. Pat. No. 6,337,059, hereby incorporated by reference in its entirety. Suitable amines for the first amine absorber zone from DOW include the UCARSOL™ AP series solvents such as AP802, AP804, AP806, AP810 and AP814. The carbon dioxide and hydrogen sulfide are absorbed by the amine while the hydrogen passes through first amine scrubber zone and into line 216 to be recycled to reaction zone 204. The amine is regenerated and the carbon dioxide and hydrogen sulfide are released and removed in line 262. Within the first amine absorber zone, regenerated amine may be recycled for use again. The released carbon dioxide and hydrogen sulfide in line 262 are passed through optional second amine scrubber zone 258 which contains an amine selective to hydrogen sulfide, but not selective to carbon dioxide. Again, suitable amines are available from DOW and from BASF, and in one embodiment the amines are a promoted or activated MDEA. Suitable amines for the second amine absorber zone from DOW include the UCARSOL™ HS series solvents such as HS 101, HS 102, HS103, HS104, HS 115. Therefore the carbon dioxide passes through second amine scrubber zone 258 and into line 266. The amine may be regenerated which releases the hydrogen sulfide into line 260. At least a portion of the hydrogen sulfide in line 260 may be recycled to the reaction zone 204, possibly in measured controlled amount. Excess hydrogen sulfide may be directed to a Claus plant. Regenerated amine is then reused. Conditions for the first amine solution absorber zone includes from about 30 to about 60 C and a pressure in the range of about 3447 kPa (500 psia) to about 6895 kPa (1000 psia) and conditions for the second amine solution absorber zone (258) includes from about 20 to about 60° C. and a pressure in the range of about 138 kPa (20 psia) to about 241 kPa (35 psia).

In another embodiment, the amine solution absorber zone 256 may contain the amine solution of U.S. Pat. No. 4,710,362 which selectively separates only the carbon dioxide and allows the hydrogen sulfide to pass with the hydrogen into recycle line 216. In this embodiment, the second amine absorber zone 258 is not necessary.

In yet another embodiment, amine scrubber zone 256 may contain the flexible amine scrubber such as shown in FIG. 4 and described in detail above. In this embodiment, the amine solvent best suited for the separation required is provided to the absorber.

Figure 3:
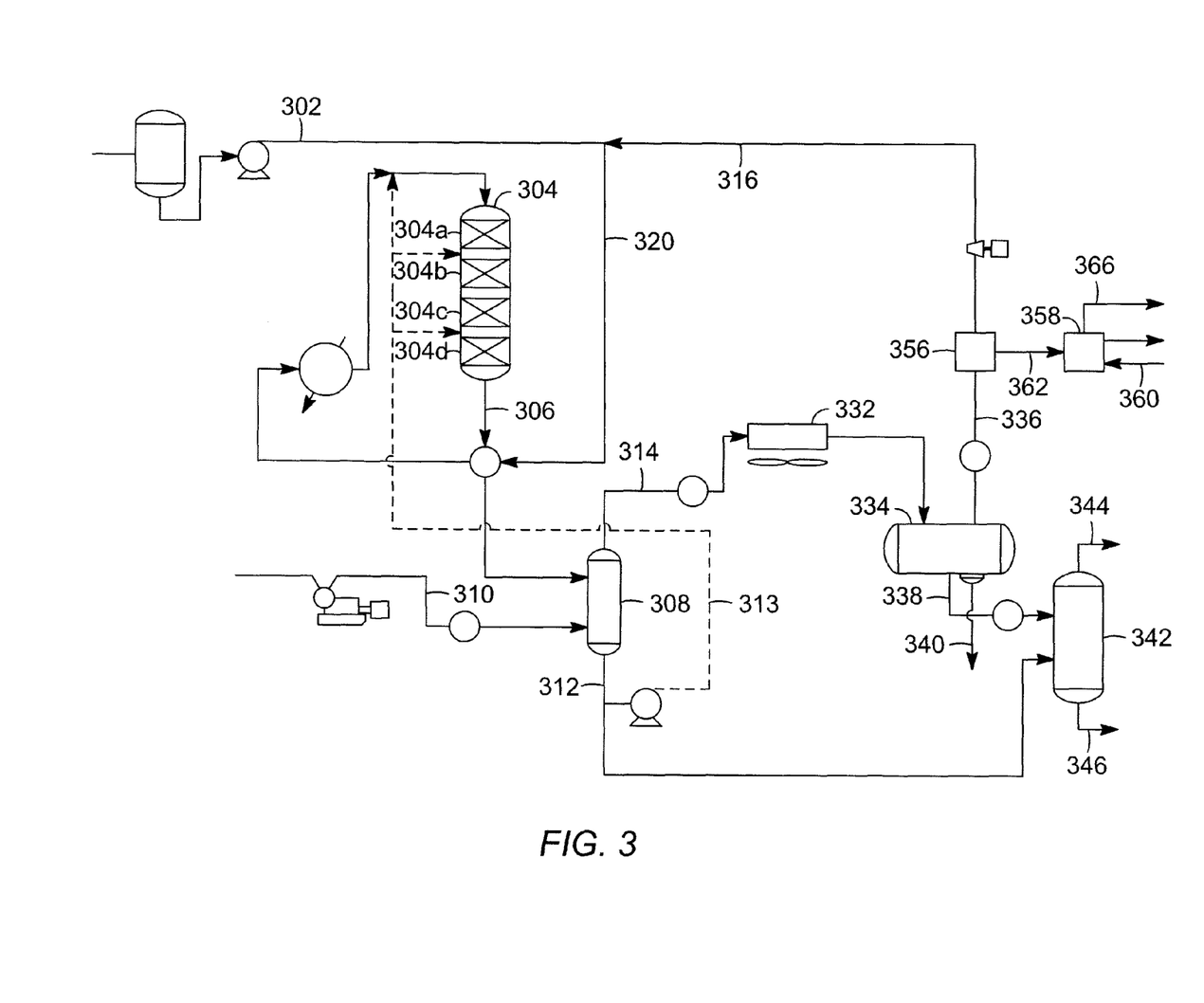
FIG. 3 is a detailed flow scheme diagram of the embodiment of the invention employing the optional hot high pressure hydrogen stripper.

Another embodiment of the invention employs a hot high pressure hydrogen stripper. Turning to FIG. 3, the process begins with a renewable feedstock stream 302 which may pass through an optional feed surge drum. The feedstock stream is combined with recycle stream 316 to form combined feed stream 320, which is heat exchanged with reactor effluent and then introduced into deoxygenation reactor 304. The heat exchange may occur before or after the recycle is combined with the feed. Deoxygenation reactor 304 may contain multiple beds shown in FIG. 3 as 304a, 304b, 304c and 304d. Deoxygenation reactor 304 contains at least one catalyst capable of catalyzing decarboxylation and/or hydrodeoxygenation of the feedstock to remove oxygen. Deoxygenation reactor effluent stream 306 containing the products of the decarboxylation and/or hydrodeoxygenation reactions is removed from deoxygenation reactor 304 and heat exchanged with stream 320 containing combined feed to the deoxygenation reactor. Stream 306 comprises a liquid component containing largely normal paraffin hydrocarbons in the diesel boiling range and a gaseous component containing largely hydrogen, vaporous water, carbon monoxide, carbon dioxide and propane.

Deoxygenation reactor effluent stream 306 is directed to hot high pressure hydrogen stripper 308. Make up hydrogen in stream 310 is also introduced to hot high pressure hydrogen stripper 308. In hot high pressure hydrogen stripper 308, the gaseous component of deoxygenation reactor effluent 306 is stripped from the liquid component of deoxygenation reactor effluent 306 using make-up hydrogen 310 and optional recycle hydrogen (not shown). The gaseous component comprising hydrogen, vaporous water, carbon monoxide, carbon dioxide and possibly some propane, is separated into hot high pressure hydrogen stripper overhead stream 314. The remaining liquid component of deoxygenation reactor effluent 306 comprising primarily normal paraffins having a carbon number from about 8 to about 24 with a cetane number of about 60 to about 100 is removed as hot high pressure hydrogen stripper bottoms 312.

A portion of hot high pressure hydrogen stripper bottoms forms recycle stream 313 and is combined with renewable feedstock combined stream 320. Another portion of recycle stream 313, optional stream 313a, may be routed directly to deoxygenation reactor 304 and introduced at interstage locations such as between beds 304a and 304b and/or between beds 304c and/or 304d between 304b and 304c (not shown) in order, for example, to aid in temperature control. The remainder of hot high pressure hydrogen stripper bottoms in stream 312 is routed to product recovery column 342.

Hydrogen stripper overhead stream 314 is air cooled using air cooler 332 and introduced into product separator 334. In product separator 334 the gaseous portion of the stream comprising hydrogen, carbon monoxide, hydrogen sulfide, carbon dioxide and propane are removed in stream 336 while the liquid hydrocarbon portion of the stream is removed in stream 338. A liquid water byproduct stream 340 may also be removed from product separator 334. Stream 338 is introduced to product recovery column 342 where components having higher relative volatilities are separated into stream 344 with the remainder, the diesel range components, being withdrawn from product recovery column 342 in line 346. Stream 344 may be introduced into a fractionator which operates to separate LPG into an overhead and leaving a naphtha bottoms (not shown).

The vapor stream 336 from product separator 334 contains the gaseous portion of the isomerization effluent which comprises at least hydrogen, carbon monoxide, hydrogen sulfide, carbon dioxide and propane and is directed to a system of amine absorbers to separate carbon dioxide and hydrogen sulfide from the vapor stream. Because of the cost of hydrogen, it is desirable to recycle the hydrogen to deoxygenation reactor 304, but it is not desirable to circulate the carbon dioxide or an excess of sulfur containing components. In order to separate sulfur containing components and carbon dioxide from the hydrogen, vapor stream 336 is passed through a system of at least two amine absorbers, also called scrubbers, starting with the first amine absorber zone 356. The amine chosen to be employed in first amine scrubber 356 is capable of selectively removing at least both the components of interest, carbon dioxide and the sulfur components such as hydrogen sulfide. Suitable amines are available from DOW and from BASF, and in one embodiment the amines are a promoted or activated methyldiethanolamine (MDEA). The promoter may be piperazine, and the promoted amine may be used as an aqueous solution. See U.S. Pat. No. 6,337,059, hereby incorporated by reference in its entirety. Suitable amines for the first amine absorber zone from DOW include the UCARSOL™ AP series solvents such as AP802, AP804, AP806, AP810 and AP814. The carbon dioxide and hydrogen sulfide are absorbed by the amine while the hydrogen passes through first amine scrubber zone and into line 316 to be recycled to reaction zone 304. The amine is regenerated and the carbon dioxide and hydrogen sulfide are released and removed in line 362. Within the first amine absorber zone, regenerated amine may be recycled for use again. The released carbon dioxide and hydrogen sulfide in line 362 are passed through second amine scrubber zone 358 which contains an amine selective to hydrogen sulfide, but not selective to carbon dioxide. Again, suitable amines are available from DOW and from BASF, and in one embodiment the amines are a promoted or activated MDEA. Suitable amines for the second amine absorber zone from DOW include the UCARSOL™ HS series solvents such as HS 101, HS 102, HS 103, HS 104, HS115. Therefore the carbon dioxide passes through second amine scrubber zone 358 and into line 366. The amine may be regenerated which releases the hydrogen sulfide into line 360. At least a portion of the hydrogen sulfide in line 360 may be recycled to the reaction zone 304, possibly in measured controlled amount. Excess hydrogen sulfide may be directed to a Claus plant. Regenerated amine is reused. Conditions for the first amine solution absorber zone includes from about 30 to about 60° C. and a pressure in the range of about 3447 kPa (500 psia) to about 6895 kPa (1000 psia) and conditions for the second amine solution absorber zone (258) includes from about 20 to about 35° C. and a pressure in the range of about 138 kPa (20 psia) to about 241 kPa (35 psia).

In another embodiment, the amine solution absorber zone 356 may contain the amine solution of U.S. Pat. No. 4,710, 362 which selectively separates only the carbon dioxide and allows the hydrogen sulfide to pass with the hydrogen into recycle line 316. In this embodiment, the second amine absorber zone 358 is not necessary.

In yet another embodiment, amine scrubber zone 356 may contain the flexible amine scrubber such as shown in FIG. 4 and described in detail above. In this embodiment, the absorber contains the amine solvent best suited for the separation required.

The invention claimed is:

1. A process for producing a paraffin-rich diesel product from a renewable feedstock comprising:
    a) treating the feedstock in a reaction zone by hydrogenating and deoxygenating the feedstock using at least one catalyst at reaction conditions in the presence of hydrogen and at least one sulfur containing component to provide a reaction zone product stream comprising hydrogen, hydrogen sulfide, carbon dioxide, water and a hydrocarbon fraction comprising paraffins useful as a diesel boiling range fuel;
    b) cooling the reaction zone product stream and separating, at a separation temperature and at essentially the same pressure as the reaction pressure:
        i) a gaseous component comprising at least hydrogen, hydrogen sulfide, and carbon dioxide;
        ii) a hydrocarbon component comprising the paraffins and depleted in at least CO2;
        iii) a water component;
    c) selectively recovering a portion of the hydrocarbon component and recycling a portion of the hydrocarbon component to the reaction zone, wherein the recovering and recycling are at essentially the same pressure as the reaction pressure;
    d) passing the gaseous component, at essentially the same pressure as the reaction pressure and at a temperature that is at least about 1° C. above the separation temperature of step (b), though at least one amine absorber zone to produce a stream containing at least hydrogen and depleted in carbon dioxide; and
    e) recycling the stream containing at least hydrogen and depleted in carbon dioxide to the reaction zone.

2. The process of claim 1 wherein the amine absorber zone contains an amine selective to carbon dioxide, and the stream containing at least hydrogen and depleted in carbon dioxide further comprises hydrogen sulfide.

3. The process of claim 2 wherein the amine is an aqueous solution of a polyoxypropylene triamine having the formula:

where R' represents a methylene group and R" represents hydrogen or methyl or ethyl and wherein the sum of X+Y=Z is a positive integer having a value of from about 4 to about 6.

4. The process of claim 1 wherein the amine absorber zone contains an amine selective to both carbon dioxide and hydrogen sulfide, said process further comprising:
    regenerating the amine selective to both carbon dioxide and hydrogen sulfide to generate an acid gas stream containing carbon dioxide and hydrogen sulfide;

passing the acid gas stream through a second amine absorber zone containing an amine selective to hydrogen sulfide to generate a carbon dioxide stream;

regenerating the amine selective to hydrogen sulfide to generate a hydrogen sulfide stream; and recycling at least a portion of the hydrogen sulfide stream to reaction zone.

5. The process of claim 4 wherein the amine absorber zone and the second amine absorber zone comprises aqueous solutions of methyldiethanolamine and piperazine.

6. The process of claim 1 wherein the amine absorber is a flexible amine absorber.

7. The process of claim 1 wherein the portion of the hydrocarbon component recycled to the reaction zone is at a volume ratio of recycle to feedstock in the range of about 2:1 to about 8:1.

8. The process of claim 1 wherein the reaction conditions in the reaction zone include a temperature of about 40° C. to about 400° C. and a pressure of about 689 kPa absolute (100 psia) to about 13,790 kPa absolute (2000 psia) and the separating is at a pressure that is no more than 1034 kPa absolute (150 psia) less than the pressure of the reaction zone.

9. The process of claim 1 wherein the treating of step 1 a) further comprises isomerizing paraffins.

10. The process of claim 1 further comprising adding make up hydrogen to the stream containing at least hydrogen and depleted in carbon dioxide that is recycled to the reaction zone.

11. The process of claim 1 further comprising pre-treating the feedstock in a pretreatment zone at pretreatment conditions to remove at least a portion of contaminants in the feedstock.

12. The process of claim 1 further comprising treating a petroleum derived hydrocarbon in the reaction zone with the renewable feedstock.

13. The process of claim 1 wherein the renewable feedstock comprises at least one component selected from the group consisting of canola oil, corn oil, soy oil, rapeseed oil, soybean oil, colza oil, tall oil, sunflower oil, hempseed oil, olive oil, linseed oil, coconut oil, castor oil, peanut oil, palm oil, mustard oil, cottonseed oil, inedible tallow, yellow and brown greases, lard, train oil, fats in milk, fish oil, algal oil, sewage sludge, ratanjoy oil, wild castor oil, jangli oil erandi oil, mohuwa oil, karanji honge oil, neem oil, and mixtures thereof.

14. The process of claim 1 wherein the renewable feedstock further comprises at least one co-feed component selected from the group consisting of spent motor oils, spent industrial lubricants, used paraffin waxes, liquids derived from the gasification of coal followed by a downstream liquefaction step, liquids derived from the gasification of biomass followed by a downstream liquefaction step, liquids derived from the gasification of natural gas followed by a downstream liquefaction step, liquids derived from depolymerization of waste plastics, synthetic oils, and mixtures thereof.

* * * * *